United States Patent [19]

Fukoka et al.

[11] Patent Number: 5,196,950
[45] Date of Patent: Mar. 23, 1993

[54] OPTICAL READER AND LIGHT SOURCE USED FOR THE SAME

[75] Inventors: Shinobu Fukoka; Takeshi Kamada, both of Atsugi, Japan

[73] Assignee: Ricoh Company, Ltd., Tokyo, Japan

[21] Appl. No.: 387,016

[22] Filed: Jul. 31, 1989

[30] Foreign Application Priority Data

Aug. 4, 1988 [JP] Japan .......................... 63-102685[U]
Sep. 14, 1988 [JP] Japan ............................ 63-231325
Dec. 27, 1988 [JP] Japan ............................ 63-331170
May 15, 1989 [JP] Japan ............................. 1-120743

[51] Int. Cl.⁵ .......................... H04N 1/04; H04J 40/14
[52] U.S. Cl. ........................... 358/475; 358/496; 250/578.1; 355/67
[58] Field of Search ............... 358/475, 496, 498, 471, 358/474, 482; 250/578.1, 208.1; 355/67, 68; 364/296, 297

[56] References Cited

U.S. PATENT DOCUMENTS

| | | | |
|---|---|---|---|
| 4,483,609 | 11/1984 | Harada | 355/67 |
| 4,518,249 | 5/1985 | Murata et al. | 355/67 |
| 4,733,280 | 3/1988 | Irie | 355/67 |
| 4,806,775 | 2/1989 | Uchida | 358/496 |
| 4,933,817 | 6/1990 | Mochizuki et al. | 355/67 |

FOREIGN PATENT DOCUMENTS 57-141174 9/1982 Japan.
58-177957 11/1983 Japan.
60-147177 8/1985 Japan.

Primary Examiner—Stephen Brinich
Assistant Examiner—Thomas D. Lee
Attorney, Agent, or Firm—Oblon, Spivak, McClelland, Maier & Neustadt

[57] ABSTRACT

An optical reader includes a transport mechanism for transporting a document in a document transport direction. The transport mechanism includes a lower guide plate and an upper guide plate opposite to the lower guide plate so as to form a gap through which the document is transported. The lower guide plate has an opening window. A light source obliquely projects light along a projection optical axis onto the document through the opening window. A read element receives light reflected by the document and outputting an electrical signal corresponding to the received light. The read element has a read optical axis along which the light reflected by the document comes. The read optical axis and the projection optical axis intersect on the side of the upper guide plate outside of the gap.

14 Claims, 14 Drawing Sheets

FIG. 6a
PRIOR ART
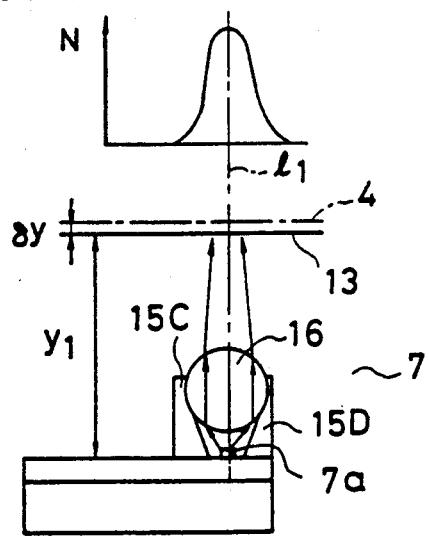
FIG. 6b
PRIOR ART
FIG. 7a
PRIOR ART
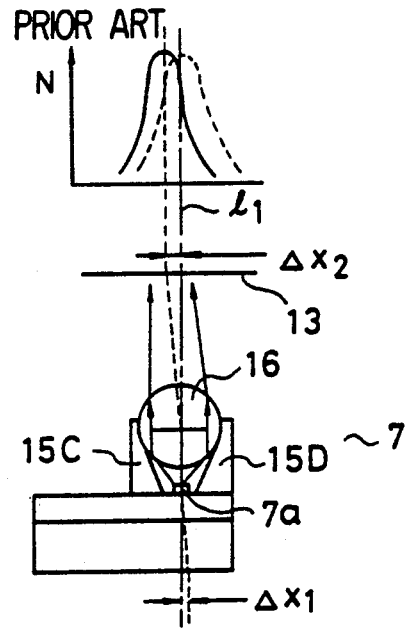
FIG. 7b
PRIOR ART F I G. 10
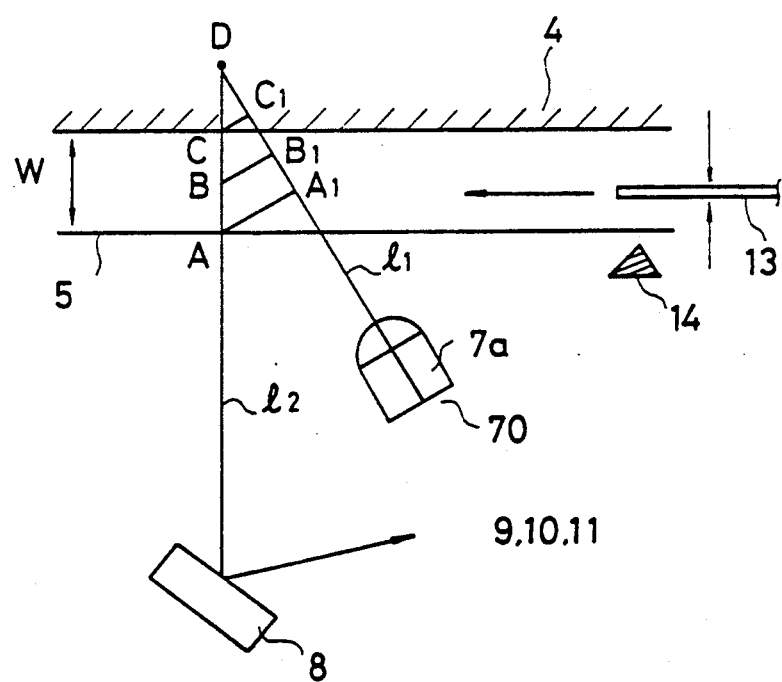

F I G. 13
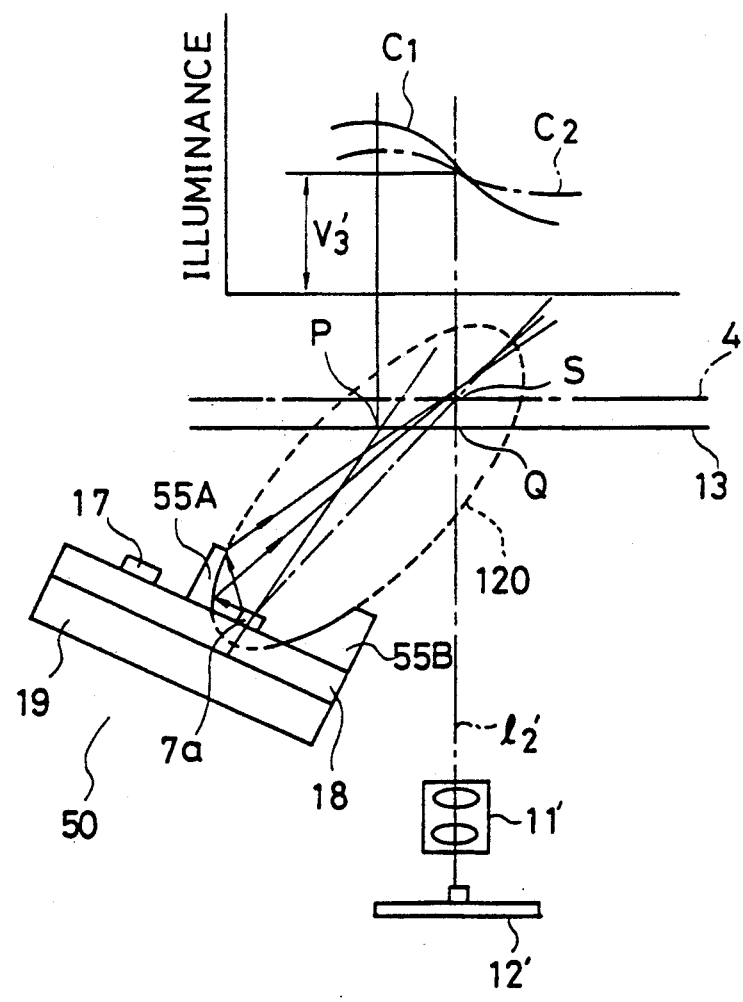

F I G. 14
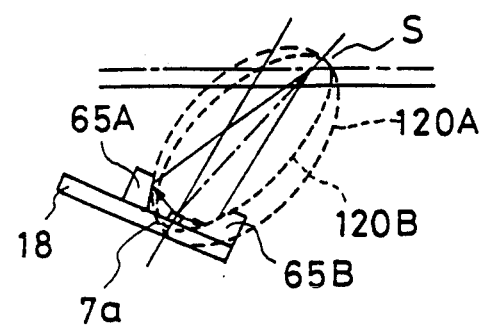
F I G. 15
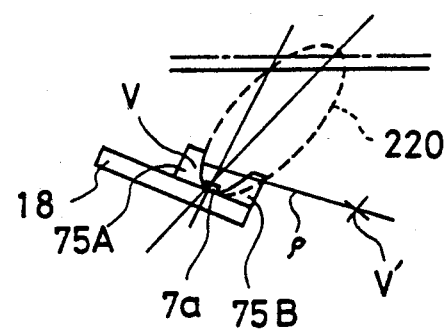

OPTICAL READER AND LIGHT SOURCE USED FOR THE SAME

BACKGROUND OF THE INVENTION

The present invention generally relates to an optical reader and a light source used for the optical reader, and particularly to an optical reader used in a facsimile machine and a light source including a light emitting diode (LED) array.

A facsimile machine includes an optical system for optically scanning a document.

Referring to FIG. 1, there is shown a mechanism of a facsimile machine, to which the present invention directly relates. A document 13 inserted from a document table 1 is transported in the direction of an arrow A along an upper guide plate 4 and a lower guide plate 5 by document transport rollers 2 and 3. A light source 7 including an LED array is arranged so that light emitted therefrom is projected onto the transported document 13 through an opening window 6 formed in the lower guide plate 5. The light source 7 has a projection optical axis $l_1$ extending therefrom to the opening window 6. Light emitted from the light source 7 is reflected on the document 13, and passes through a first reflection mirror 8, a second reflection mirror 9 and a third reflection mirror 10 along a read optical axis $l_2$. Then, the light is converged through an imaging lens 11, and is projected onto a read element 12 which can be a device such as a charge coupled device (hereinafter simply referred to as a CCD).

FIG. 2 is a side view of another optical reader provided in a facsimile machine. In FIG. 2, those parts which are the same as those in FIG. 1 are given the same reference numerals. The document 13 is transported in the direction of an arrow B by the document transport rollers 2 and 3. The light source 7 is positioned so that light emitted therefrom is obliquely projected onto the document 13 through the opening window 6 formed in the lower guide plate 5.

The document 13 is inserted and transported so as to pass between the upper and lower guide plates 4 and 5 by the document transport rollers 2, 3 and pressure rollers 2' and 3'. The document transport roller 2 and the pressure roller 2' are paired, and the document transport roller 3 and the pressure roller 3' are paired. The document transport rollers 2 and 3 are driven by motors (not shown). The pressure rollers 2' and 3' are urged by springs (not shown). The upper guide plate 4 has an area which is painted with a white coating material. This area corresponds to a document read position and faces the light source 7 through the opening window 6. Light emitted from the light source 7 is reflected on the document 13, and passes through a mirror 10' and the imaging lens 11. Then, the light from the imaging lens 11 is projected onto the read element.

A gap W between the upper and lower guide plates 4 and 5 should be between to 0.5-1.5 mm so that the document 13 is transported without jamming. When the gap is made narrower than 0.5 mm, paper jam is liable to occur. In order to prevent the occurrence of paper jam, structural elements must be formed and positioned with high precision. This increases the cost of the device.

When the document 13 passes through the gap W between the upper and lower guide plates 4 and 5, the illuminance is not even but depends on positions of the transported document 13 with respect to the light source 7. FIG. 3 is a graph of an luminance characteristic of a LED. The graph shows that the value of illuminance N decreases with an increase of distance from the center thereof.

FIGS. 4 and 5 are diagrams of conventional optical readers which are directed to overcoming the occurrence of uneven luminance. Referring to FIG. 4, an intersecting point F of the optical axis $l_1$ extending from the light source 7 and the read optical axis $l_2$ extending from the document 13 is set at the center of the document passable gap W. A point E on the read optical axis $l_2$ is closer to the light source 7 than the intersecting point F. However, the point E deviates from a point $E_1$ on the projection optical axis $l_1$ by $E - E_1$. Therefore, the value of luminance (quantity of light) at the point E is approximately equal to or greater than that at the point F. On the other hand, the value of luminance at a point $G_1$ on the projection optical axis $l_1$ and the value of luminance at a point G on the read optical axis $l_2$ decrease as these points go away from the intersecting point F. Therefore, when the document 13 passes between the intersecting point F and the upper guide plate 4, the level of a white video signal output from the read element 12 at this time is not sufficient to indicate white and is thus indicative of gray (i.e., an intermediate color between white and black). That is, an area which is originally to be handled as white is determined to be gray, which deteriorates the quality of a reproduced image.

It is conceivable that the distance $G_1$-G is set smaller than the distance $E_1$-E, i.e., $(G_1-G)<(E_1-E)$ where the optical axis $l_1$ is arranged so that the intersecting point F is closer to the light source 7 than the point G on the read optical axis $l_2$. By the above-mentioned arrangement, it becomes possible to obtain almost the same luminance values at the point G (far from the light source 7) and the point E (close to the light source 7). However, the arrangement presents a disadvantage that the luminance value at the point F at the center of the document passable gap W is greater than that at the point E or G, and thus there is a possibility that a gray area on the document 13 may be recognized to be white in error when the document 13 passes through the intersecting point F.

Referring to FIG. 5, the read element 12 is movably provided so as to move in the directions of an arrow M (upper and lower directions) with respect to a read optical axis $l_2'$ from the imaging lens 11 (not shown in FIG. 5 for convenience' sake). The position of the read element 12 having the read optical axis $l_2'$ is adjusted with respect to the document transport direction K irrespective of the projection optical axis $l_1$ so that the luminance value at a point I on the upper guide plate 4 is equal to that at a point H on the lower guide plate 5. This causes a substantial positional deviation of the read light axis $l_2$. As a result, the distance between a document sensor 14 used for determining a read starting position and a document read position is not constant. Thus, it is required to mechanically adjust the read starting position. Unless the read starting position is adjusted, an end area on the document 13 which crosses the projection optical axis $l_1$ before starting the document read or after terminating the document read, is different for different documents of even same size. Normally, front and rear end portions of the document 13 are handled as blank areas which are not subjected to document reading. If the read starting position is not mechanically adjusted, the blank areas are not constant on an area in the vicinity of the front or rear end position, and thus information to be read may be lost.

FIG. 6 is a diagram of a configuration of the conventional light source 7, and is a graph of an luminance v. distance characteristic of the illustrated light source 7. In the following description, reference "7a" indicates either an LED array or an LED chip. As shown in FIG. 6(a), the light source 7 has an LED array 7a made up of a plurality of LED chips, on both sides of which a pair of reflection frames 15C and 15D are arranged. A rod lens 16 is supported by the reflection frames 15C and 15D. Light beams emitted from the LED array 7a are converged by the rod lens 16 held between the reflection frames 15C and 15D. As shown in FIG. 6(b), the value of luminance N of the light source 7 has a peak on the projection optical axis $l_1$. The luminance N decreases with an increase in distance from the projection optical axis $l_1$. If there is an error in position of the LED chip 7a mounted on a base and therefore the LED chip 7a deviates from the projection optical axis $l_1$ of the rod lens 16, this positional error of the LED chip 7a is increased on the document 13. For example, as shown in FIG. 7, if the optical axis of the LED array 7a deviates from the projection optical axis $l_1$ of the rod lens 16 by $\Delta x_1$, the optical axis of the deviating LED chip 7a is inclined with respect to the projection optical axis $l_1$ as shown by a broken line, and a deviation $\Delta x_2$ from the peak equal to a few times the deviation $\Delta x_1$ appears on the document 13. Additionally, an error of the luminance position is caused by deviation in of the rod lens 16 itself and an error in fastening the rod lens 16 to the reflection frames 15C and 15D. A conventional light source configured in a manner similar to that shown in FIG. 5 is disclosed in Japanese Laid-Open Utility Model Application No. 58-177957, Japanese Laid-Open Patent Application No. 57-141174, or 60-147177.

Turning to FIG. 6, the distance $y_1$ between the LED chip 7a and the document 13 is set long so as to ensure the convergence characteristic of the rod lens 16. For example, the distance $y_1$ is selected between 10–20 mm. In this case, a difference in quantity of light based on the distance $\delta y$ between the document 13 and the upper guide plate 4 can substantially be ignored due to the function of the convergence characteristic of the rod lens 16. That is, the illuminance characteristic is not affected by the distance $\delta y$.

Alternatively, it is conceivable that a light source is configured without using a rod lens. FIG. 8 is a diagram of a light source which does not use a rod lens. Referring to FIG. 8, a light source 70 includes a printed circuit board 18, on which there are mounted the LED chips 7a forming an LED array, resistors 17 (only one is shown) and a pair of reflection frames 15A and 15B. The printed circuit board 18 is supported by a supporting member 19. The projection optical axis $l_1$ of the LED chip 7a is inclined with respect to the document 13. With this structure, it is possible to reduce the distance $y_2$ between the LED chip 7a and the document 13 and the distance $y_3$ between the LED chip 7a and the upper guide plate 4. Additionally, it is preferable to use the structural elements of small size.

The imaging lens 11 and the read element 12 are positioned so that the document read position corresponds to an luminance position P in the normal direction related to the surface of the document 13. However, the above-mentioned arrangement presents the following disadvantages. There is the difference between the quantity of light V1 on the document 13 and the quantity of light V2 on the white area formed on the upper guide plate 4. This difference is larger than ($y_2/y_3$) and less than square of the ratio of $y_2$ to $y_3$ as shown below:

$$(y_2/y_3) < (V_2/V_1) < (y_2/y_3)^2. \tag{1}$$

FIG. 9 is a graph of a video signal observed at the document read position P shown in FIG. 8. The illustrated video signal is output from the read element 12 when the document 13 narrower than a document read width R in the main scanning direction perpendicular to the transport direction of the document 13 is set in the facsimile machine 13. In the illustrated video signal, the quantity V1 of light reflected on a portion of the upper guide plate 4 outside of the document 13 is smaller than the quantity V2 of light reflected on the document 13. This is based on the above-mentioned formula (1). As a result, the document 13 is recognized as gray at the time of halftone image processing, for example.

SUMMARY OF THE INVENTION

It is an object of the present invention to provide an improved optical reader and an improved light source used for the optical reader in which the aforementioned disadvantages are eliminated.

A more specific object of the present invention is to provide an optical reader having less difference in luminance over the document passable range.

Another object of the present invention is to provide an optical reader which can prevent an increase of the front end area or rear end area of the document which is not subjected to document reading.

Yet another object of the present invention is to provide an economical optical reader without the need for a rod lens as part of a light source.

The above-mentioned objects of the present invention can be achieved by an optical reader includes a transport mechanism for transporting a document in a document transport direction. The transport mechanism includes a lower guide plate and an upper guide plate opposite to the lower guide plate so as to form a gap through which the document is transported. The lower guide plate has an opening window. A light source obliquely projects light along a projection optical axis onto the document through the opening window. A read element receives light reflected by the document and outputting an electrical signal corresponding to the received light. The read element has a read optical axis along which the light reflected by the document comes. The read optical axis and the projection optical axis intersect on the side of the upper guide plate outside of the gap.

Yet another object of the present invention is to provide a light source suitable for the aforementioned light source.

This object of the present invention can be achieved by a light source adapted to an optical reader including a transport mechanism which transports a document in a document transport direction and includes a lower guide plate and an upper guide plate opposite to said lower guide plate so as to form a gap through which said document is transported. The lower guide plate has an opening window, and said optical reader includes a read element receiving light reflected by said document and having a read optical axis along which said light reflected by said document goes. The light source includes a base member, and a light emitting diode array (LED array) made up of a plurality of light emitting diode chips arranged into a line. The LED array projects light onto said document along a projection optical axis. A pair of first and second reflection frames are mounted on said base member and arranged on both sides of said LED array. The first and second reflection frames have reflection surfaces opposite to each other. A first position where said projection optical axis and said document intersect is present upstream in the document transport direction, as compared with a second position where said read optical axis and said document intersect. The second reflection frame is closer to said second position than said first reflection frame. The reflection surface of said first reflection frame includes a curved surface which corresponds to a part of a first ellipse in the cross section of said curved surface.

Other objects, features and advantages of the present invention will become apparent from the following detailed description when read in conjunction with the accompanying drawings.

BRIEF DESCRIPTION OF THE DRAWINGS

FIGS. 6a, 6b, 7a and 7b are diagrams of a conventional light source having a rod lens;

FIG. 10 is a diagram of a first preferred embodiment of the present invention;

FIG. 13 is a diagram of a third preferred embodiment of the present invention;

FIG. 14 is a diagram of a fourth preferred embodiment of the present invention;

FIG. 15 is a diagram of a fifth preferred embodiment of the present invention;

DESCRIPTION OF THE PREFERRED EMBODIMENTS

A description is given of a first preferred embodiment of the present invention.

Figure 4:
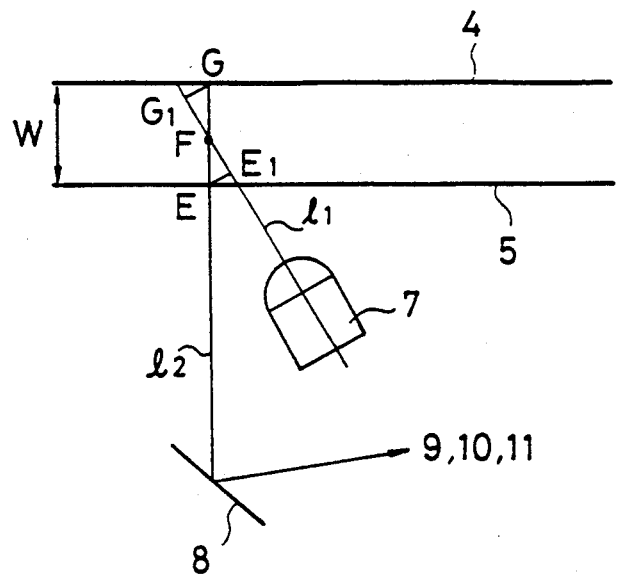
FIG. 4 is a diagram of a conventional optical reader.
Figure 5:
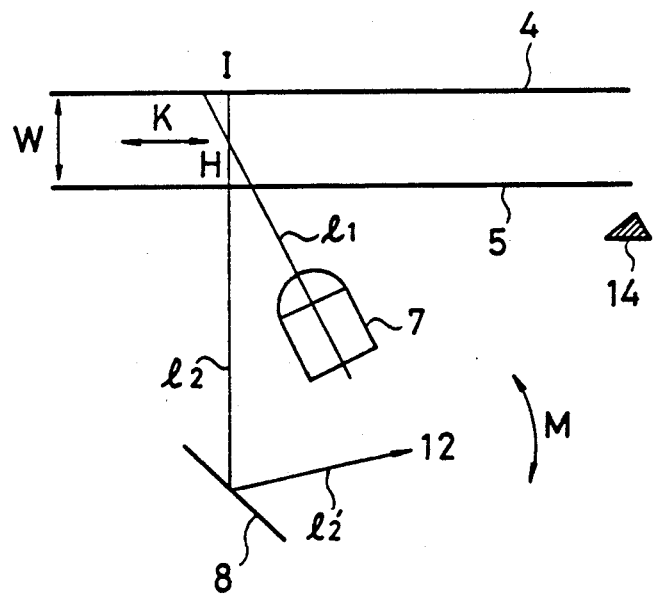
FIG. 5 is a diagram of another conventional optical reader.

Referring to FIG. 10, there is illustrated an optical reader according to a first preferred embodiment of the present invention. Those parts which are the same as those in the previous figures are given the same reference numerals. Referring to FIG. 10, an intersecting point D of the projection optical axis $l_1$ from the LED array 7a provided in the light source 7 and the read optical axis $l_2$ of the first reflection mirror 8 is outside of the document passable range W formed between the upper and lower guide plates 4 and 5 and is positioned in or near (beyond) the upper guide plate 4. That is, the intersecting point D is positioned downstream, as compared with the intersecting point F shown in FIG. 4. The document passable width W is equal to the sum of the thickness of the document 13 and sufficient margin gaps so that the document 13 can smoothly pass between the upper and lower guide plates 4 and 5. It is noted that it is impossible to exactly identify the position where the document 13 passes. However, by partially providing the document 13 being transported with tension by the document transport rollers 2 and 3, it is possible to pass the tension applied document 13 through a fixed position. However, it is impossible to make front and rear end portions of the document 13 pass through the fixed position because at this time the document 13 is no longer supplied with tension.

The present invention intends to obtain almost the same luminance values on the document 13 being transported wherever when the document 13 passes through any of positions A, B and C shown in FIG. 10. As described previously, the intersecting point D of the optical axes $l_1$ and $l_2$ is positioned outside of the document passable range W and is in or beyond the upper guide plate 4. Thus, the illuminance values at points A, B and C have the following relationship:

$$A_1 > B_1 > C_1.$$

where $A_1$, $B_1$ and $C_1$ are points obtained by drawing perpendicular lines to the line $l_1$ from the positions A, B and C on the read optical axis $l_2$, respectively. The deviations of the positions A, B and C from the projection optical axis $l_1$ have the following relationship:

$$\overline{AA_1} \gtrsim \overline{BB_1} \gtrsim \overline{CC_1}.$$

Figure 1:
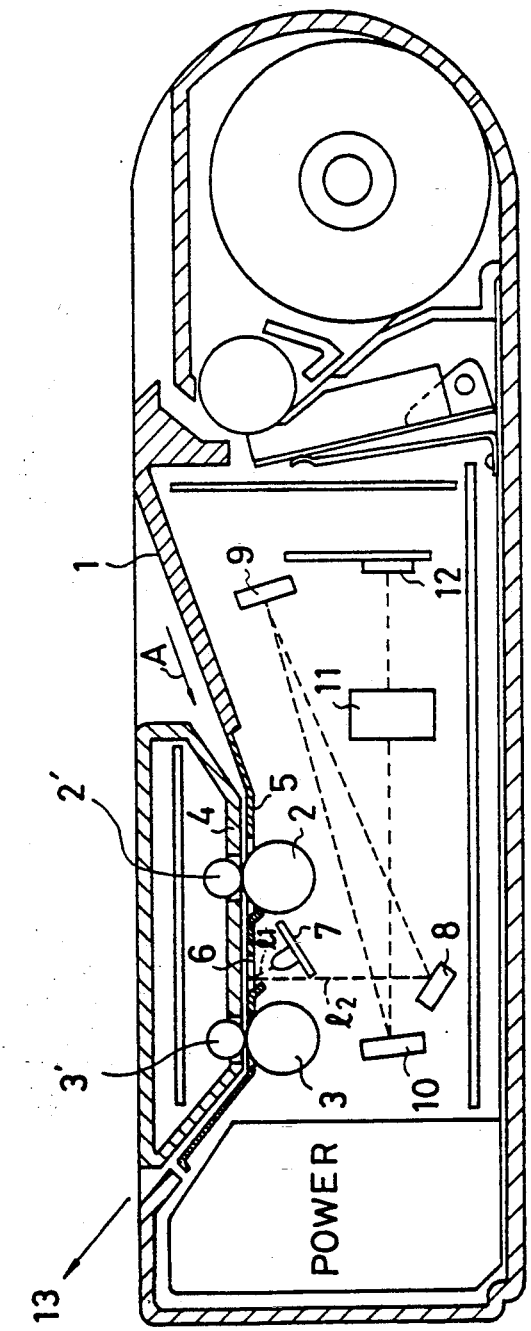
FIG. 1 is a diagram of a facsimile machine having an optical reader.
Figure 2:
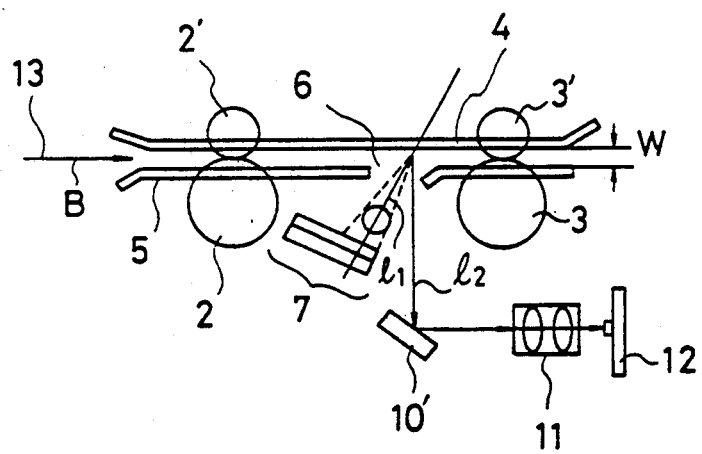
FIG. 2 is a diagram of a facsimile machine having another optical reader.
Figure 3:
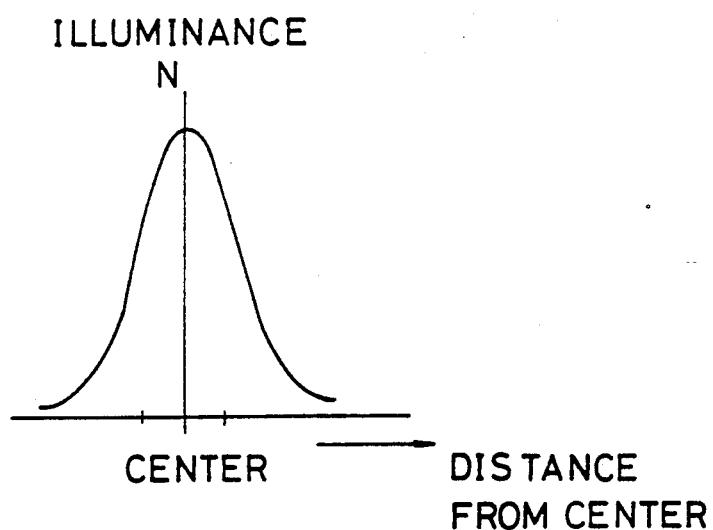
FIG. 3 is a graph of an illuminance characteristic of an LED chip.

Therefore, when the intersecting point D is selected so that the difference in luminance based on the distance from the light source 70 corresponds to the difference in luminance based on the deviation from the projection optical axis $l_1$, almost the same illuminance values are obtained over the document passable range W connecting the points A, B and C irrespective of the characteristics of the LED chip 7a shown in FIG. 3. As a result, the document 13 can be read with high accuracy. Further, there is no need for adjusting the document read starting position. Moreover, it is possible to reduce the size of the opening window and thus reduce paper jamming caused by the presence of the opening window.

It is preferable that the light source 70 shown in FIG. 10 be formed by one of the light sources according to the following embodiments of the present invention.

Figures 8A, 8B:
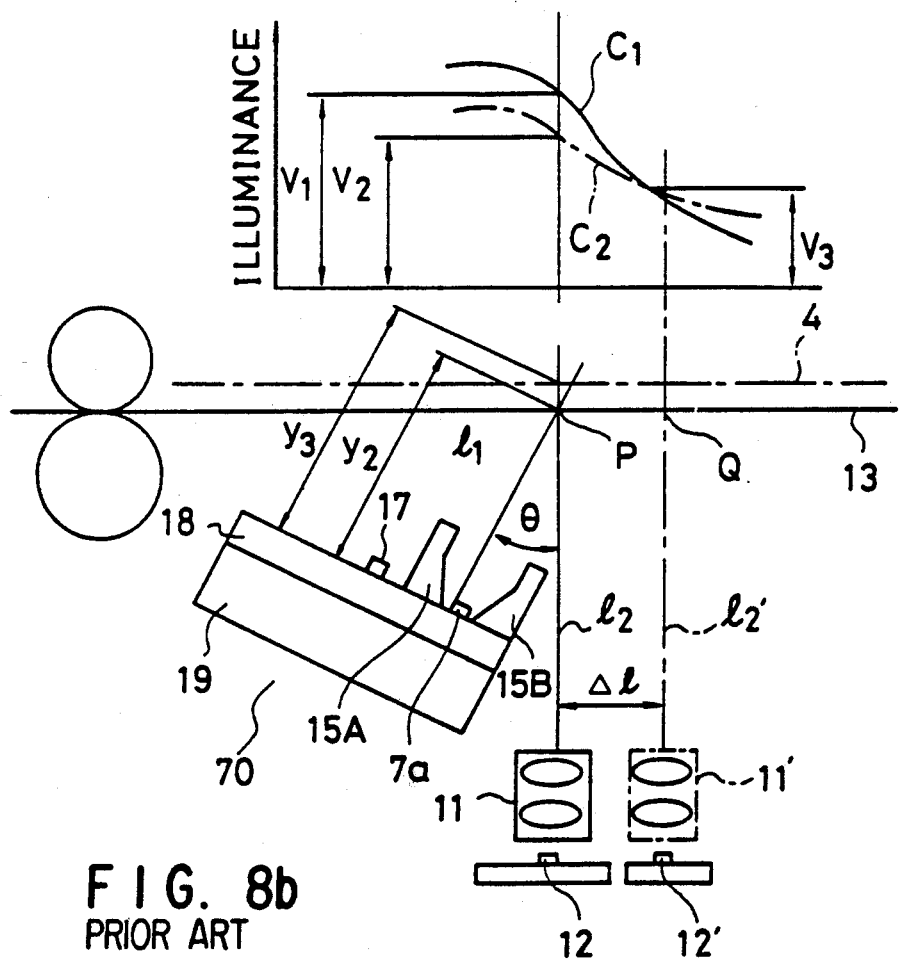
FIGS. 8a, 8b and 9 are views illustrating disadvantages of the conventional light source.
Figure 9:
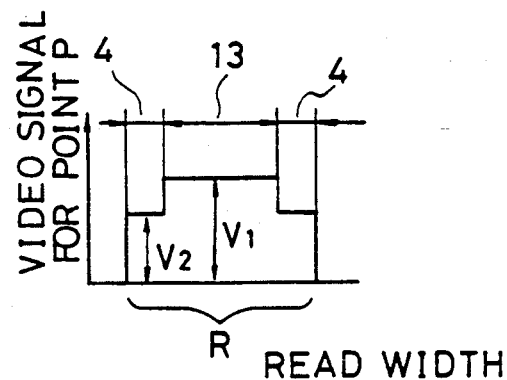
Figure 11:
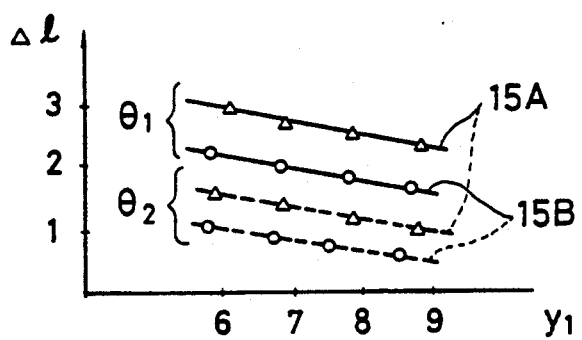
FIG. 11 is a graph of the experimental results.

Before describing a second preferred embodiment of the present invention, a further description is given of the light source 70 shown in FIG. 8 by referring to FIG. 11. FIG. 11 is a graph of luminance characteristics of the light source 70 which has a pair of reflection frames 15A and 15B and does not have any rod lens. The horizontal axis of the graph of FIG. 11 represents the distance between the LED chip 7a and the document 13, and the vertical axis thereof represents the distance between the original position of the read element 12 and a position where the read element 12 deviates from the original position by Δl in the document transport position shown by a one-dot chain line (FIG. 8). As shown in FIG. 8, an incident angle θ is formed by the projection optical axis $l_1$ corresponding to the normal direction of the LED chip 7a and the read optical axis $l_2$ of the read element 12. The illuminance characteristics are measured where $\theta = \theta_1$ and $\theta = \theta_2$ ($\theta_1 < \theta_2$).

The luminance characteristics obtained by the experiments show the following. As shown in FIG. 8, the quantity of light on the document 13 is equal to the quantity of light on the upper guide plate 4 at a position Q which is apart, by a distance $\Delta l$, from the intersecting point P of the normal direction of the LED chip 7a and the surface of the document 13. In other words, the position P is present upstream in the transport direction, as compared with the position Q. Further, the value of distance $\Delta l$ is based on the distance $y_2$ between the LED chip 7a and the intersecting point P, the incident angle $\theta$ between the normal direction of the LED chip 7a and the normal direction of the document 13, and the shape of each of the reflection frames 15A and 15B. Generally, there is a trend that $\Delta l$ decreases with an increase of the incident angle $\theta$ and an increase of $y_1 (=y_2)$. This trend can also be seen from the graph of FIG. 11.

Thus, when the document read position is set to the position Q, it becomes possible to obtain the same video outputs (levels) for the painted white area on the upper guide plate 4 and a white area on the document 13.

Figure 12:
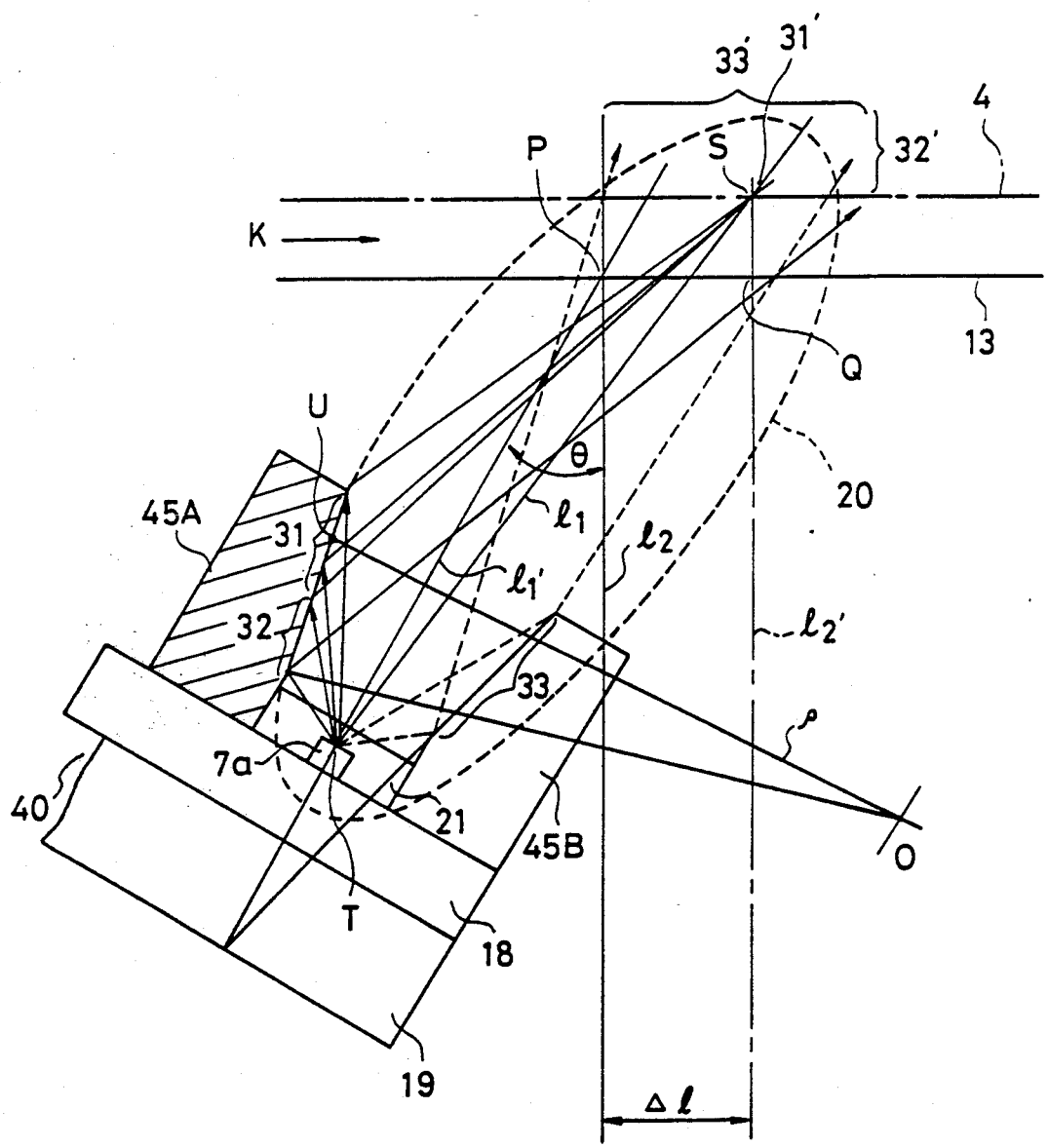
FIG. 12 is a diagram of a second preferred embodiment of the present invention.

Curve C1 shown in FIG. 8 is an luminance characteristic measured on the document 13, and curve C2 is an luminance characteristic measured on the upper guide plate 4. As described previously, when the document read position is shifted by $\Delta l$, the obtained absolute luminance value V3 is smaller than the illuminance value for the position P. On the other hand, as shown in FIG. 12 (which will be described later), the reflected light beams from the reflection frames 15A and 15B are irradiated on a position S on the upper guide plate 4 just above the position Q. As a result, the quantity of light V3 can be increased.

A description is given of a second preferred embodiment of the present invention with reference to FIG. 12. In FIG. 12, those parts which are the same as those in the previous figures are given the same reference numerals. A light source 40 has reflection frames 45A and 45B, which are mounted on the printed circuit board 18 supported by the supporting member 19. Reflection surfaces 31 and 32 which are part of an inner wall of the reflection frame 45A are formed by an arc having a radius of curvature $\rho$ with the center O of curvature for a point U on an ellipse 20 having, as two focuses thereof, a central point T of the LED chip 7a and the aforementioned point S on the upper guide plate 4 corresponding to the document read position shifted by distance $\Delta l$ from the point P. The read optical axis $l_2'$ extends from the point S to the real element 12 (not shown in FIG. 12). On the other hand, the reflection frame 45B has a reflection surface 33 which is a flat part of an inner wall thereof. The reflection frames 45A and 45B mounted on the printed circuit board 18 are arranged on both sides of the LED array 7a, and are mechanically coupled together by ribs 21 provided both sides of the LED array 7a. As shown by plural solid lines in FIG. 12, light fluxes emitted from the center T of the LED chip 7a are reflected on the reflection surface 31 of the reflection frame 15A and are converged at the line position S. As a result of this convergence, it becomes possible to reduce the difference between the illuminance characteristic lines C1 and C2 (FIG. 8) and increase the absolute quantity of light to a quantity of light V3' as shown in FIG. 13.

As described above, the position Q on the document 13 presents an increased quantity of light V3' and an increase in illuminance based on the convergence characteristic of the reflected light fluxes. Further, the reflected light fluxes from the reflection surface 32 are present over a range 32' between the point Q on the document 13 and the point S on the upper guide plate 4, so that the quantity of light V3 on the document 13 shown in FIG. 8 can equally be increased.

The flat reflection surface 33 formed in the reflection frame 45B functions to convert the incident light fluxes into divergent light fluxes present over a range 33' which includes points P and Q. The diverging light fluxes increase the quantity of light V1 shown in FIG. 8.

It is now assumed that the conventional reflection surface is substituted for the reflection surfaces 31 and 32 of the reflection frame 45A in order to compare the light source 40 and the conventional light source 70 shown in FIG. 8. In this case, the quantity of light which comes from the reflection slants 45A and 45B in which is obtained at the point Q is always greater than that at the point P. In order to obtain almost the same quantity of light at the points P and Q, the value of the deviation $\Delta l$ to be set when the conventional reflection surface is used, must be greater than the value to be set when the reflection surfaces 31 and 32 are used. For this reason, it is impossible to effectively increase the quantity of light B3 shown in FIG. 8.

A description is given of a third preferred embodiment of the present invention with reference to FIG. 13. In FIG. 13, those parts which are the same as those in the previous figures are given the same reference numerals. A light source according to the third embodiment includes a pair of reflection frames 55A and 55B. An essential feature of the third embodiment is that each of the reflection frames 55A and 55B has a reflection surface having the following cross section. That is, a reflection surface of each of the reflection frames 55A and 55B is a part of an ellipse 120 having, as two focuses thereof, one being a point on the LED chip 7a, and the second being a point on a line connecting the point on the LED chip 7a and the intersecting point S where the read optical axis $l_2'$ of the imaging lens 11' crosses the upper guide plate 4. The third embodiment can present the almost same advantages as the second embodiment.

FIG. 14 is a side view of a fourth preferred embodiment of the present invention. A light source according to the fourth embodiment includes a pair of reflection frames 65A and 65B. An essential feature of the fourth embodiment is that a reflection surface of the reflection frame 65A is a part of an ellipse 120A, which is different from an ellipse 120B, a part of which forms a reflection surface of the reflection frame 65B. That is, the reflection surfaces of the reflection frames 65A and 65B have different values of eccentricity. Light fluxes reflected on the reflection surface of the reflection frame 65B are converged to the point S. Thus, the quantity of light at the line position S is further increased.

A fifth preferred embodiment of the present invention is shown in FIG. 15. A light source according to the fifth embodiment includes a pair of frames 75A and 75B. An essential feature of the fifth embodiment is that a reflection surface of the reflection frame 75A is a part of a circle having a radius equal to the radius of curvature $\rho$ having the center of curvature V' for a point V on the reflection surface. The reflection frame 75B has a reflection surface which is formed in the same manner as the reflection surface of the reflection frame 75A.

Alternatively, the reflection surface of the reflection frame 75B closer to the document read position may be flat. In this case, the reflection surface of the reflection frame 75A may be a part of an ellipse in place of circle.

Figure 16:
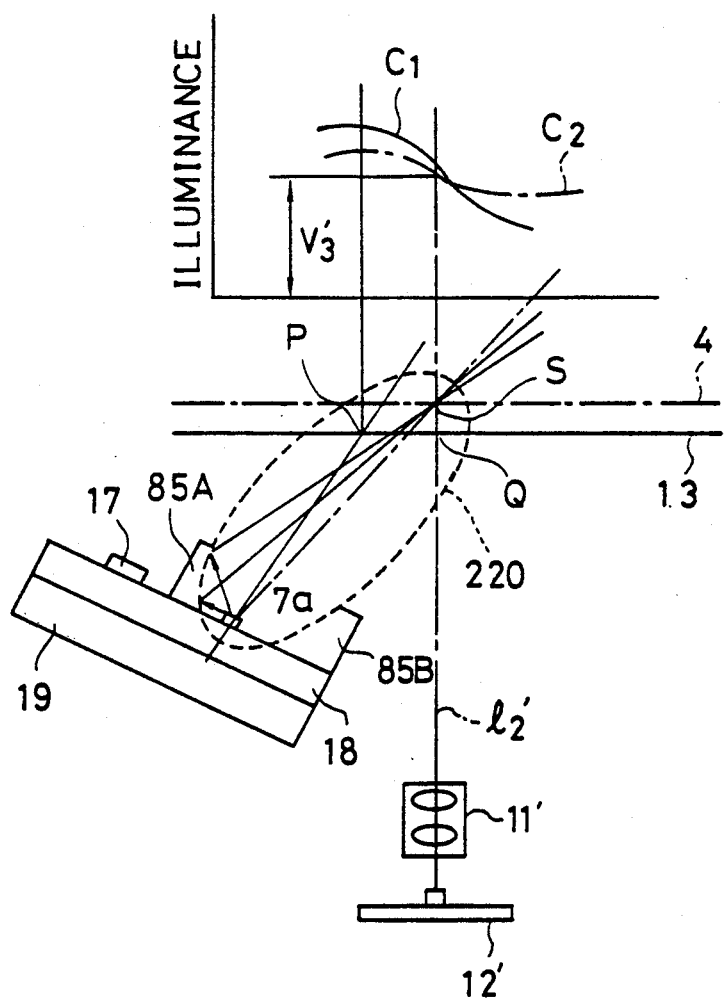
FIG. 16 is a diagram of a sixth preferred embodiment of the present invention.

A sixth embodiment of the present invention is shown in FIG. 16. The six embodiment includes a pair of reflection frames 85A and 85B. An essential feature of the sixth embodiment is that a reflection surface of each of the reflection frames 85A and 85B is a part of an ellipse 220 having, as two focuses thereof, the intersecting point S where the read optical axis $l_2'$ of the imaging lens 11' crosses the upper guide plate 4, and a point on the LED chip 7a. That is, the sixth embodiment corresponds to variation of the third embodiment shown in FIG. 14.

Figure 17A:
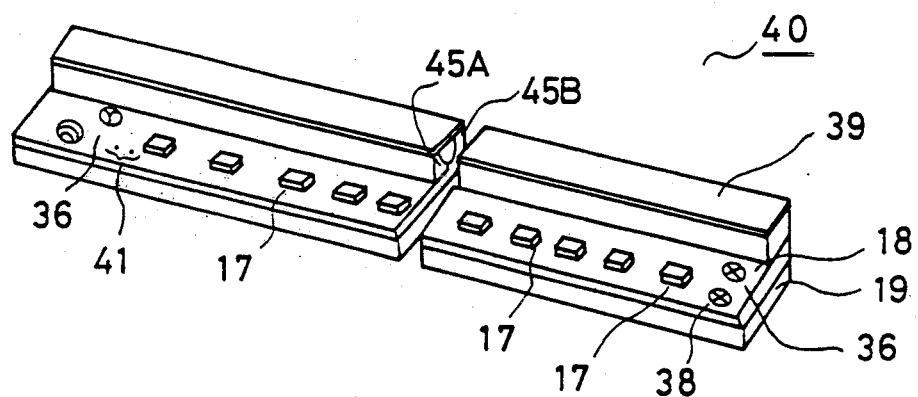
FIG. 17A is a perspective view of the second embodiment shown in FIG. 12.
Figure 17B:
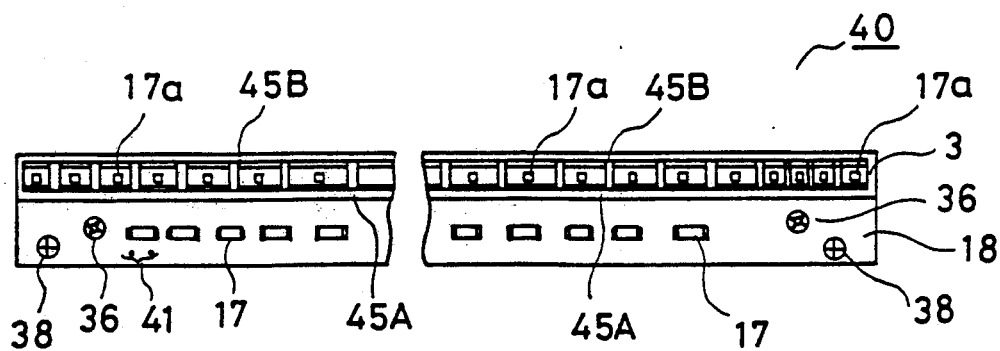
FIG. 17B is a plan view of the second embodiment.
Figure 18:
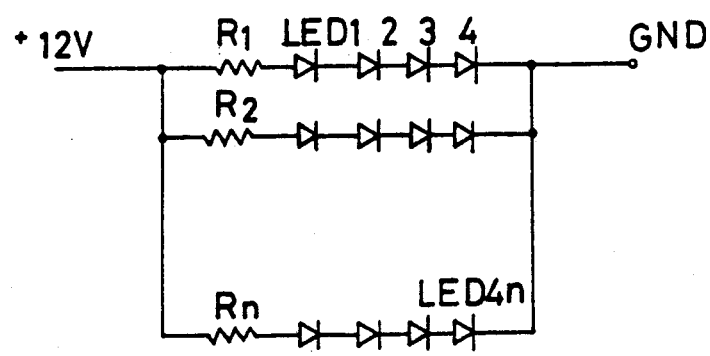
FIG. 18 is a circuit diagram of the light source according to the second embodiment.

FIGS. 17A and 17B are perspective and plan views of the light source 40 according to the second embodiment shown in FIG. 12. In FIGS. 17A and 17B, those parts which are the same as those in FIG. 12 are given the same reference numerals. The printed circuit board 18 is supported by the supporting member 19, which also serves as a condenser. The printed circuit board 18 and the supporting member 19 are secured by screws 36. On the printed circuit board 18, there are provided a plurality of resistors 17, terminals 41 for external connection, and a circuit pattern (not shown). The resistors 17 are connected to the circuit pattern by soldering, for example, so that a circuit as shown in FIG. 18 is formed. The resistors 17 provide resistance R1, R2, . . . Rn, and LED1, LED2, . . . , LED4n are LED chips 7a. Further, the reflection frames 45A and 45B are fastened on the printed circuit board 18 by thermal caulking with bosses (not shown), for example. A plurality of LED chips 7a are arranged into a line between the reflection frames 45A and 45B. A pitch between neighboring LED chips 7a in a center portion of the LED array is larger than that in both sides thereof. Thereby, luminance at both sides of the read line is increased so as to be equal to the luminance that the center thereof. A transparent cover 39 is mounted on the reflection frames 45A and 45B so as to cover the LED chips 7a. Alternatively, the transport cover 39 may be fitted into grooves formed in the reflection frames 45A and 45B. The transparent cover 39 may be formed of glass or plastic. The other embodiments of the present invention can be constructed in a manner similar to the second embodiment.

Figure 19:
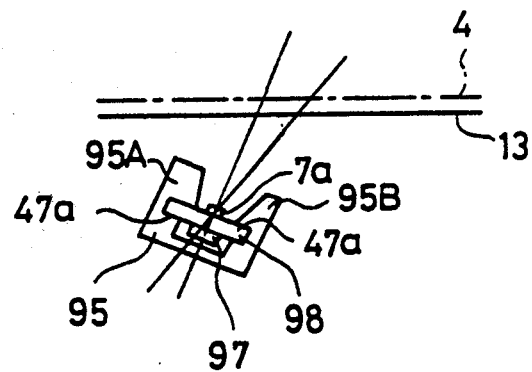
FIG. 19 is a view illustrating an assembly of the light source according to the present invention.

FIG. 19 is another assemble of the light source according to the present invention. An integrally formed reflection member 95 has a pair of reflection frames 95A and 95B, each of which has a reflection surface which is any one of the aforementioned reflection surfaces. It is noted that there is no need for fastening reflection frames on the printed circuit board as in the case of the light source shown in FIGS. 17A and 17B. The reflection member 95 also serves as a condenser. It is noted that since the reflection member 95 is integrally formed, it functions as a condenser very well. The reflection member 95 may be formed of aluminum. For example, a desired shape of the reflection member 95 may be made by an extrusion or press molding process. It is preferable that the aluminum reflection member 95 be coated with an insulating material. The reflection member 95 has grooves 47a opposite each other. A printed circuit board 98 is fitted into the grooves 47a. It is noted that no thermal caulking operation is required. A plurality of LEDs 7a are arranged into a line on the upper surface of the printed circuit board 98, and a plurality of resistors 97 are mounted on the lower surface of the printed circuit board 98.

The present invention is not limited to the aforementioned embodiments and variations and modifications may be made without departing from the scope of the present invention.

What is claimed is:

1. An optical reader comprising:
   transport means for transporting a document in a document transport direction, said transport means including a lower guide plate and an upper guide plate opposite to said lower guide plate so as to form a gap through which said document is transported, said lower guide plate having an opening window;
   light source means for obliquely projecting light along a projection optical axis onto said document through said opening window;
   a first reflection frame mounted adjacent to said light source means;
   read means for receiving light reflected by said document and outputting an electrical signal corresponding to the received light, said read means having a read optical axis along which said light reflected by said document goes,
   said read optical axis and said projection optical axis intersecting on the side of said upper guide plate outside of said gap, having a first position where said projection optical axis and said document intersect and which is upstream in the document transport direction, as compared with a second position where said read optical axis and said document intersect,
   a second reflection frame which is closer to said second position than said first reflection frame,
   the reflection surface of said first reflection frame includes a curved surface which corresponds to a part of a first ellipse two focuses thereof, a first being a point on said LED chip, and the second being a point where said read optical axis and said upper guide plate intersect and which is in the cross section of said curved surface.

2. An optical reader as claimed in claim 1, wherein the reflection surface of said second reflection frame includes a flat reflection surface.

3. A light source adapted to an optical reader including a transport mechanism which transports a document in a document transport direction and includes a lower guide plate and an upper guide plate opposite to said lower guide plate so as to form a gap through which said document is transported, said lower guide plate having an opening window, said optical reader including a read element receiving light reflected by said document and having a read optical axis along which said light reflected by said document goes, said light source comprising:
   a base member;
   a light emitting diode array (LED array) made up of a plurality of light emitting diode chips arranged into a line, said LED array projecting light onto said document along a projection optical axis; and
   a pair of first and second reflection frames mounted on said base member and arranged on both sides of said LED array,
   said first and second reflection frames having reflection surfaces opposite to each other,
   a first position where said projection optical axis and said document intersect being present upstream in the document transport direction, as compared with a second position where said read optical axis and said document intersect, said second reflection frame being closer to said second position than said first reflection frame, the reflection surface of said first reflection frame including a curved surface which corresponds to a part of a first ellipse having two focuses the first being a point on said LED chip, and the second being a point where said read optical axis and said upper guide plate intersect and which is in the cross section of said curved surface.

4. A light source as claimed in claim 3, wherein the reflection surface of said second reflection frame includes a flat reflection surface.

5. A light source as claimed in claim 3, wherein said first and second frames are integrally formed with said base member.

6. A light source as claimed in claim 5, wherein said first and second reflection frames and said base member are formed of aluminum.

7. A light source as claimed in claim 6, wherein said first and second reflection frames and said base member formed of aluminum is covered by an insulating material.

8. A light source adapted to an optical reader including a transport mechanism which transports a document in a document transport direction and includes a lower guide plate and an upper guide plate opposite to said lower guide plate so as to form a gap through which said document is transported, said lower guide plate having an opening window, said optical reader including a read element receiving light reflected by said document and having a read optical axis along which said light reflected by said document goes, said light source comprising:

a base member;

a light emitting diode array (LED array) made up of a plurality of light emitting diode chips arranged into a line, said LED array projecting light onto said document along a projection optical axis; and a pair of first and second reflection frames mounted on said base member and arranged on both sides of said LED array;

said first and second reflection frames having reflection surfaces opposite to each other, a first position where said projection optical axis and said document intersect being present upstream in the document transport direction, as compared with a second position where said read optical axis and said document intersect, said second reflection frame being closer to said second position than said first reflection frame, the reflection surface of said first reflection frame including a curved surface which corresponds to a part of a first ellipse in the cross section of said curved surface, a first position where said projection optical axis and said document intersect is present upstream in the document transport direction, as compared with a second position where said read optical axis and said document intersect, said second reflection frame is closer to said second position than said first reflection frame, the reflection surface of said first reflection frame includes a curved surface which corresponds to a part of an ellipse in the cross section of said curved surface.

9. A light source adapted to an optical reader including a transport mechanism which transports a document in a document transport direction and includes a lower guide plate and an upper guide plate opposite to said lower guide plate so as to form a gap through which said document is transported, said lower guide plate having an opening window, said optical reader including a read element receiving light reflected by said document and having a read optical axis along which said light reflected by said document goes, said light source comprising:

a base member;

a light emitting diode array (LED array) made up of a plurality of light emitting diode chips arranged into a line, said LED array projecting light onto said document along a projection optical axis; and a pair of first and second reflection frames mounted on said base member and arranged on both sides of said LED array, said first and second reflection frames having reflection surfaces opposite to each other, a first position where said projection optical axis and said document intersect being present upstream in the document transport direction, as compared with a second position where said read optical axis and said document intersect, said second reflection frame being closer to said second position than said first reflection frame, the reflection surface of said first reflection frame including a curved surface which corresponds to a part of a first ellipse in the cross section of said curved surface, said first and second reflection frames are integrally formed with said base member, and have opposed grooves said base member includes a printed circuit board on which said LED array is mounted, said printed circuit board is fitted into said grooves formed in said first and second reflection frames.

10. A light source adapted to an optical reader including a transport mechanism which transports a document in a document transport direction and includes a lower guide plate and an upper guide plate opposite to said lower guide plate so as to form a gap through which said document is transported, said lower guide plate having an opening window, said optical reader including a read element receiving light reflected by said document and having a read optical axis along which said light reflected by said document goes, said light source comprising:

a base member;

a light emitting diode array (LED array) made up of a plurality of light emitting diode chips arranged into a line, said LED array projecting light onto said document along a projection optical axis; and a pair of first and second reflection frames mounted on said base member and arranged on both sides of said LED array, said first and second reflection frames having reflection surfaces opposite to each other, a first position where said projection optical axis and said document intersect being present upstream in the document transport direction, as compared with a second position where said read optical axis and said document intersect, said second reflection frame being closer to said second position than said first reflection frame, the reflection surface of said first reflection frame including a curved surface which corresponds to a part of a first ellipse having two focuses, the first being a point on said LED chip, and the second being a point on a line connecting a point where said read optical axis and said upper guide plate intersect at said point on the said LED array and which is in the cross section of said curved surface.

11. An optical reader comprising:

transport means for transporting a document in a document transport direction, said transport means including a lower guide plate and an upper guide plate opposite to said lower guide plate so as to form a gap through which said document is transported, said lower guide plate having an opening window;

light source means for obliquely projecting light along a projection optical axis onto said document through said opening window;

a first reflection frame mounted adjacent to said light source means;

read means for receiving light reflected by said document and outputting an electrical signal corresponding to the received light, said read means having a read optical axis along which said light reflected by said document goes, said read optical axis and said projection optical axis intersecting on the side of said upper guide plate outside of said gap, having a first position where said projection optical axis and said document intersect and which is upstream in the document transport direction, as compared with a second position where said read optical axis and said document intersect, a second reflection frame which is closer to said second position that said first reflection frame, the reflection surface of said first reflection frame includes a curved surface which corresponds to a part of a first ellipse two focuses thereof, a first being a point on said LED chip, and the second being on a line connecting a point where said read optical axis and said upper guide plate intersect and said point on said LED chip.

12. An optical reader comprising:

transport means for transporting a document in a document transport direction, said transport means including a lower guide plate and an upper guide plate opposite to said lower guide plate so as to form a gap through which said document is transported, said lower guide plate having an opening window;

light source means for obliquely projecting light along a projection optical axis onto said document through said opening window;

a first reflection frame mounted adjacent to said light source means;

read means for receiving light reflected by said document and outputting an electrical signal corresponding to the received light, said read means having a read optical axis along which said light reflected by said document goes, said read optical axis and said projection optical axis intersecting on the side of said upper guide plate outside of said gap, having a first position where said projection optical axis and said document intersect and which is upstream in the document transport direction, as compared with a second position where said read optical axis and said document intersect, a second reflection frame which is closer to said second position that said first reflection frame, the reflection surface of said first reflection frame includes a curved surface which corresponds to a part of a circle in the cross section of said curve surface which corresponds to a part of a first ellipse two focuses thereof, a first being a point on said LED chip, and the second being a point where said read optical axis and said upper curve guide intersect and which is in the cross section of said curve surface.

13. An optical reader as claimed in claim 12, wherein the reflection surface of said second reflection frame includes a flat surface.

14. An optical reader as claimed in claim 12, wherein the reflection surface of said second reflection frame includes a curved surface which corresponds to a part of a circle in the cross section of said curved surface.

* * * * *

UNITED STATES PATENT AND TRADEMARK OFFICE
CERTIFICATE OF CORRECTION

PATENT NO.  : 5,196,950
DATED       : March 23, 1993
INVENTOR(S) : Shinobu Fukuoka et al.

It is certified that error appears in the above-identified patent and that said Letters Patent is hereby corrected as shown below:

On the title page, Item [19] and Item [75],

The first inventor's last name is spelled incorrectly, should read as follows:   --[19]  Fukuoka et al.--

--[75]  Shinobu Fukuoka--

Signed and Sealed this

Twenty-third Day of November, 1993

Attest:

BRUCE LEHMAN

Attesting Officer

Commissioner of Patents and Trademarks